June 13, 1950          G. GREENBERG          2,511,503

SPEED LIMIT INDICATOR

Filed Sept. 3, 1946          2 Sheets—Sheet 1

GEORGE GREENBERG,
INVENTOR.

BY Julian J. Wittal his ATTORNEY.

June 13, 1950   G. GREENBERG   2,511,503
SPEED LIMIT INDICATOR

Filed Sept. 3, 1946   2 Sheets-Sheet 2

GEORGE GREENBERG,
INVENTOR.
BY: Julian J. Wittal,
his ATTORNEY.

Patented June 13, 1950

2,511,503

UNITED STATES PATENT OFFICE 2,511,503

SPEED LIMIT INDICATOR

George Greenberg, Brooklyn, N. Y.

Application September 3, 1946, Serial No. 694,657

5 Claims. (Cl. 200—56)

This invention relates to speed indicators, and has for its main purpose to provide a device of this character which will be adapted to very forcibly call to the attention of the driver of a motor vehicle the fact that a certain predetermined speed limit has been passed.

Another object of this invention is to provide a device, as characterized hereinbefore, which will give such signals and warnings continuously, after the predetermined limit of speed has been exceeded.

Still a further object of this invention is to provide a speed limit indicator and warning appliance which will be adapted to comparatively easily be attached to existing speedometers usually found on motor vehicles, and to operate in conjunction therewith.

Other objects of this invention will be apparent as the specification of the same proceeds, and, among others, I may mention: to provide a device of the character indicated which will be simple in construction, easily applied on existing motor vehicles, and which may be enlarged to give such signals of warning not only to the driver, but to those in front and in the back of the car.

In the drawings forming a part of this specification, and accompanying the same:

Figure 4:
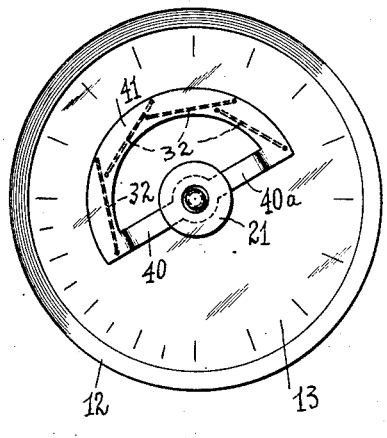
Fig. 4 is a plan view of a modification.

Referring now to the drawings more in detail by characters of reference, my invention is indicated as applied to an existing usual speedometer, but, of course, it may have its own speed indicator, which may have a similar speed indicating pointer as the speedometers have, and as indicated in the drawings.

The shaft of the speedometer, driven at a speed proportionate to the velocity of the motor vehicle, is indicated at 10, and the speed indicator pointer thereof at 11. The casing of the speedometer, or other speed indicator device having the pointer 11, is shown at 12, and it may have the usual transparent cover 13.

Figure 1:
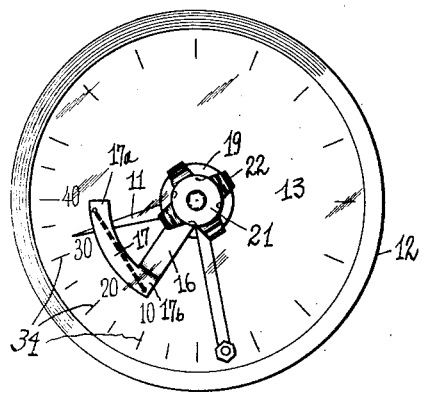
Fig. 1 is a plan view, in a semi-diagrammatical manner, of one embodiment of my invention.
Figure 2:
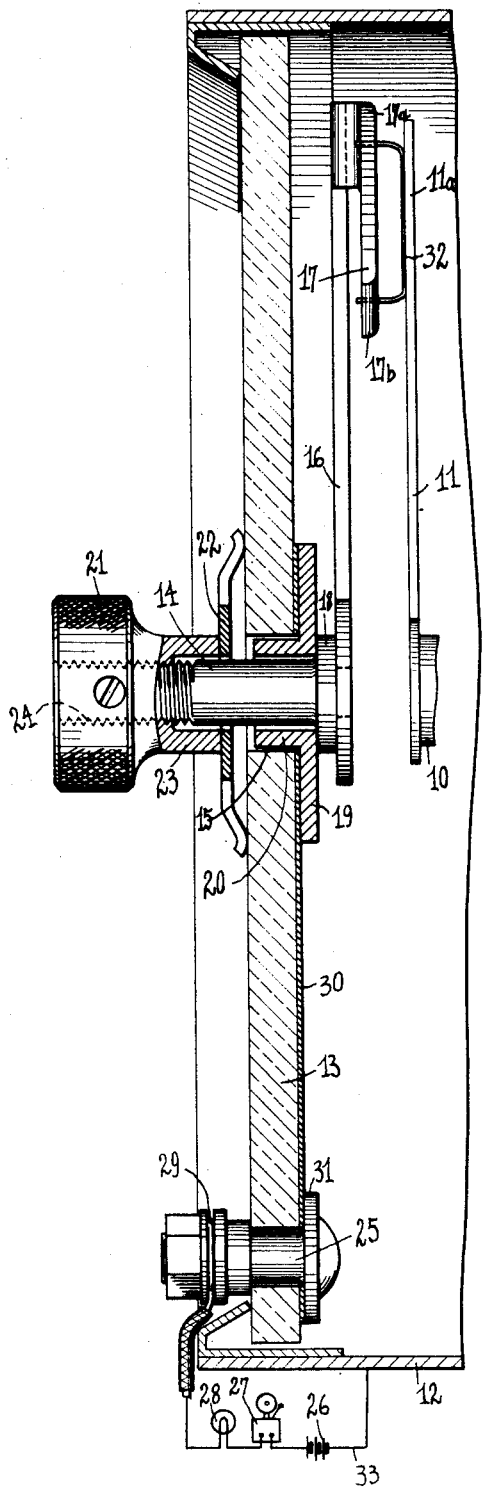
Fig. 2 is a sectional view of the same on an enlarged scale, the section being taken in such a position of the pointers of my device, where they are diametrically opposite to an electrical conductor strip, as will be described hereinafter.

According to the embodiment of my invention shown in Figs. 1 and 2, a comparatively short shaft or rotatable pin 14 will be passed through an aperture 15 in the center of the transparent cover plate 13, and in alignment with the shaft 10 of the speed indicator pointer 11.

Shaft 14 has a second pointer or arm 16, secured at its inner end, said arm or pointer terminating in an arcuate transverse member 17. A shoulder disk 18 is also provided at the inner end of the shaft 14, engaging the flange 19 of a bushing 20, while a knob 21 is secured at the outer end of the shaft 14, by which the same may be rotated.

A four-pronged spring disk 22 is pressed against the transparent cover or top 13, through the inner tubular portion 23 of the knob 21, said pressure being adjusted through the co-operating screw threads 24 between the knob and the shaft 14.

A pin 25 of electro-conductive material is passed through the cover 13 adjacent to its periphery, the same serving as one termination of the electrical signalling circuit attached to my device, as will be more fully explained presently. At 26 I indicate any suitable source of electrical current, like a battery, which may first pass through a bell 27, then a lamp 28, and finally be connected into the pole or termination 25, as at 29. A very thin, narrow electro conductive strip 30 may be secured, like by an appropriate adhesive, on the inner side of the cover 13, between the flange 31 on the pole pin 25, and the flange 19 on the bushing 20, and it will be obvious that in this manner an electrical connection is established between the battery 26 and my limit signalling pointer 16 and its curved arm extension 17.

In the embodiment shown a fine resilient hair wire loop 32 is secured underneath the extension 17, and the outer portions 11a of the speed indicator pointer 11 will be caused to slide in electrical contact with said loop 32, as long as the same will be underneath the extension 17.

It will be seen that, as long as the outer portion 11a of the pointer 11 is in engagement with the hair wire loop 32, the current may flow through said parts, and then into the shaft 10, whereby it will be grounded in the metal parts of the vehicle.

The branch of the circuit, described hereinbefore, is shown as the one starting from the negative side of the battery 26, and to complete the circuit, a conductor 33 will connect the positive pole of the battery 26 with the metal part of the vehicle, in the drawing the case 12 being shown as the termination of the conductor 33.

It also will be seen that, in case the outer portion 11a of the pointer 11 will come into contact with the wire, 32, the circuit will be closed, and the bell 27 will ring, as well as the lamp 28 will be illuminated.

Now, it is a well known fact that when operating a motor vehicle, the driver constantly has to observe the various speed limits at the various localities the vehicle passes through, and should constantly pay attention to the speedometer, to see whether the speed limit has been exceeded. This is a considerable strain on the driver's attention, and they usually neglect such a close attention, whereby very often the speed limit is exceeded, with the consequent drawbacks, troubles, and possible serious danger to the driver and to the occupants of the car. The speed limit, also, in some localities, changes very frequently, like when passing through a community, or the outskirts thereof, or through a park or on the open highway, and even if the driver notices the limit, very often he can not pay attention to keep said changing speed limits.

I am also aware of the fact that various devices have been proposed heretofore, whereby a warning signal will be given to the driver, when the limit to which he may set the speedometer has been reached. The drawback of such devices has been that they usually give only an instant short signal, and if the driver by chance does not notice it, then he may increase the speed even far beyond the limit to which the speedometer has been adjusted, by said device, and no more signal will be given to advise him of the fact.

As has been mentioned, the device of my present invention not only will give a strong warning signal when a preset speed limit has been reached, but will keep on giving said signal continuously, as long as the speed limit is reached or exceeded.

For this purpose, the speed limit indicating arm 16 is provided in my device, having a transverse arcuate extension 17, and it will be seen that, when the speed limit pointer 16 is set at a predetermined position, as soon as the speed indicator pointer 11 of the speedometer device reaches said arm, it will complete the electrical circuit described hereinbefore, and operate the signals 27 and 28. However, should the driver, at the moment, miss the said warning signals, and should the speed remain at the limit, or, as usual, go beyond the same, the signals will continuously operate. As the pointer 11 advances, it obviously will slide on the hair wire loop 32 of the arm 17, and will continuously keep the circuit closed, and the signals operating.

Arm 17 may be made of any desired length, and according to its length, the signalling will be continuous for a predetermined increase over the limit set by the pointer 16. In Fig. 1 this proportion is indicated as being about twenty-five miles increase in speed, as in said drawing, the beginning of the signalling would start at about a speed of thirteen miles, and would be kept on by the device until the speedometer pointer 11 reaches the speed of about thirty-eight miles. Obviously, under any normal conditions, a continuous illumination of a lamp and ringing of a bell for the duration during which the speed of the car increases twenty-five miles over and above the limits set, will be quite sufficient for any driver to take notice.

As also will be obvious, with my device, all that the driver has to do when he notices a certain change in the speed limit, is to set the limit pointer 16 to that speed, on the dial numerals 34, found on existing speedometers, or being provided with my device if it is built independently of an existing speedometer, and when the speed indicator pointer 11 of the speedometer device reaches the position of the pointer 16, the signalling will begin, and will be continuous, as long as the driver keeps the car at that speed and even goes beyond the same. It also will be understood that the speed indicia 34 may preferably be applied around the periphery of the transparent cover or dial plate 13.

The bell 27 and the lamp 28 may be placed in such a position in the vehicle that the driver may receive their signals without taking his attention from the road, and, of course, instead of double signals, either one of them alone may be employed, if desired. I believe that a visual and a sound signal combination are preferable, since they are addressed to two independent senses of the driver, and if one is missed by him, the other one will call his attention to the fact that the speed limit has been exceeded.

I have shown, in the preferred embodiment, the hair wire loop 32 as the contact member between the two pointers, since with such a device, the contact may be established with very slight frictional resistance against the movement of the pointer 11. In some speedometer devices, the pointer 11 is practically free moving under very light impulses, and any stronger friction would prevent its operation.

In case the speedometer pointer 11 is driven by mechanical members, so that it can overcome any friction which may arise between the sliding contact of two members not strongly pressed against each other, then the hair wire loop 32 may be omitted, transverse member 17 placed right over the speedometer pointer 11, so that when said pointer reaches said transverse arm, the two will be brought into sliding contact directly, without the intermediacy of the hair wire loop 32. For this purpose, both ends 17a and 17b of the transverse arm 17 will be formed rounded, to facilitate the sliding of the respective portion of the pointer 11 thereon.

Figure 3:
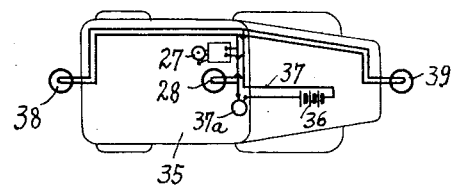
Fig. 3 is an electrical diagram to show the application of my invention to signal lights in front and in the rear of the automobile.

In Fig. 3 I indicate an electrical arrangement, whereby warning lights, or possibly also warning bells, may be arranged, in addition to those at the driver's seat, at the rear, and possibly also at the front of the motor vehicle. The purpose of this arrangement is to give people on the street a quick indication that the vehicle is running with a speed beyond the limit at the respective locality. In some cases, such an arrangement may be desirable, or possibly, it may be ordered by the authorities.

In the diagram of Fig. 3, the numeral 35 indicates the vehicle, 36 the source of current, and 37a my speed indicator and limit warning device, entirely identical in construction to the one described and shown in the earlier figures. Bell 27 and light 28 are inserted in parallelism into the electric circuit 37, and the rear light or other signal device 38 and the front one 39 also are arranged in parallelism. With such an arrangement, the failure of any one of said indicating devices will not affect the operation of the other ones. The details of construction and arrangement of the circuits of Fig. 3, and of the various signalling and warning devices, is not shown, as it will be understood by those versed in this art.

In Fig. 4 I indicate a modification of my invention, whereby the continuous signalling may be extended to a greater limit than it would be possible with the arm 17 shown in the original embodiment.

The general arrangement and operation of my speed limit warning device will be entirely identical to the one described hereinbefore, and in this modification, the numeral 12 again indicates the casing of the device, 13 the transparent dial top, 21 the adjusting or setting knob. The speed indicator pointer 11 has been omitted from this figure for the sake of clearness in showing, but it will have the same arrangement as indicated in Figs. 1 and 2.

A member in this modification has the role of the earlier speed limit indicator arm 16, as shown at 40, and it will have the diametrically opposite extensions 40a, and the earlier arcuate arm 17 will be replaced by a circular segment 41, the ends of which are secured into the ends of the arms 40 and 40a, respectively. In this manner, a substantially stable device is produced, which may cover a much larger section of a circle than the arm 17 could. In Fig. 4 it is shown as covering a full half circle. Staggered and overlapping hair wire loops 32 are arranged underneath the circular segment 41, having exactly the same construction and being arranged for the same purpose as the hair wire loop 32 in the earlier embodiment of my invention.

It will be seen that when the pointer 11 reaches the position to which the speed limit indicator arm 40 is set, the mentioned electrical circuit will be closed, and the signalling will be continuously kept up, as long as the pointer 11 slides over the plurality of hair wire loops 32, in the embodiment shown in Fig. 4 for a full half circle. In other words, continuous signalling can be given for as long as one-half of the full range of the speedometer dial.

Another modification of my invention may consist in making the extension 17 for the speed limit indicator pointer 16 adjustable in a radial direction. This modification is not shown in the drawings, but it will be understood by those versed in this art, and the purpose of it would be to adjust the radial distance of the contact extension 17 so as to fit longer or shorter speedometer pointers 11.

While I have shown preferred embodiments of my invention, it is to be understood that changes and variations may be resorted to in the elements, combinations and operation of my invention, and I reserve my rights to such changes and variations as are within the spirit of this specification, and the scope of the claims hereunto appended.

What I claim as new, and want to protect by Letters Patent of the United States, is:

1. In an electric circuit closing device, a first electro-conductive pointer adapted to swing freely to successive angular positions in a predetermined direction under the influence of an outside force, a second electro-conductive but insulated pointer turnable to be set to a stationary position relatively to said first pointer but normally being out of contact therewith, a source of electric current its two terminations being connected to the two pointers, respectively, and its circuit normally being broken, a transverse electro-conductive member on said second pointer, an electro-conductive hair spring loop projecting from said transverse member, said first pointer being adapted to electrically contact said transverse member during a phase of its travel determined by the setting of said second pointer, thereby closing said circuit at said phase by said first pointer contacting said loop and then being adapted to slide with continuous electric contact on said loop during its further travel and to keep said circuit closed while so sliding thereon.

2. The circuit closing device defined in claim 1 in which said pointers have a common axis of rotation and said transverse member is arcuate.

3. A circuit closing device defined in claim 1 and in which said pointers have a common axis of rotation and said transverse member is arcuate, and a plurality of hair spring loops projecting therefrom in the path of said first pointer.

4. In a device as set forth in claim 3, both ends of said arcuate member being secured on the second pointer.

5. In an electric circuit closing device, a first electro-conductive pointer adapted to swing freely to successive angular positions in a predetermined direction under the influence of an outside force, a second electro-conductive but insulated pointer turnable to be set to a stationary position relatively to said first pointer but normally being out of contact therewith, a source of electric current its two terminations being connected to the two pointers, respectively, and its circuit normally being broken, a transverse electro-conductive member on said second pointer, said first pointer being adapted to electrically contact said transverse member during a phase of its travel determined by the setting of said second pointer, thereby closing said circuit at said phase, said first pointer then being adapted to slide with continuous travel and to keep said circuit closed while so sliding on said member, a common axis of rotation for said two pointers, said transverse member being arcuate, said second pointer extending to two sides of said axis, and said transverse member being secured at both of its ends to the respective portions of said pointer at the two sides of said axis.

GEORGE GREENBERG.

REFERENCES CITED

The following references are of record in the file of this patent:

UNITED STATES PATENTS

| Number | Name | Date |
| --- | --- | --- |
| 566,613 | O'Connor et al. | Aug. 25, 1896 |
| 1,098,358 | Dean | May 26, 1914 |
| 1,263,280 | Paulson | Apr. 16, 1918 |
| 1,362,299 | Hall | Dec. 14, 1920 |
| 1,433,989 | Echternach | Oct. 31, 1922 |
| 1,527,279 | Smiley | Feb. 24, 1925 |
| 1,547,909 | Earle | July 28, 1925 |
| 1,567,589 | Greenawalt | Dec. 29, 1925 |
| 1,789,548 | Heap | Jan. 20, 1931 |
| 2,384,345 | Schellentrager | Sept. 4, 1945 |
| 2,452,344 | Addorisio | Oct. 26, 1948 |